US009148930B2

(12) United States Patent
Chung et al.

(10) Patent No.: US 9,148,930 B2
(45) Date of Patent: Sep. 29, 2015

(54) PIXEL AND ORGANIC LIGHT EMITTING DISPLAY USING THE SAME

(71) Applicant: Samsung Display Co., LTD., Yongin, Gyeonggi-Do (KR)

(72) Inventors: Bo-Yong Chung, Yongin (KR); Hae-Yeon Lee, Yongin (KR); Tak-Young Lee, Yongin (KR); Jin-Gon Oh, Yongin (KR); Yong-Jae Kim, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 336 days.

(21) Appl. No.: 13/869,791

(22) Filed: Apr. 24, 2013

(65) Prior Publication Data

US 2014/0168179 A1   Jun. 19, 2014

(30) Foreign Application Priority Data

Dec. 13, 2012  (KR) .......................... 10-2012-0145455

(51) Int. Cl.
*G09G 3/32* (2006.01)
*H05B 33/08* (2006.01)

(52) U.S. Cl.
CPC .......... *H05B 33/0896* (2013.01); *G09G 3/3233* (2013.01); *G09G 2300/043* (2013.01); *G09G 2300/0819* (2013.01); *G09G 2300/0852* (2013.01); *G09G 2310/027* (2013.01); *G09G 2310/0262* (2013.01); *G09G 2310/067* (2013.01); *G09G 2320/045* (2013.01)

(58) Field of Classification Search
CPC .......................... H05B 33/0896; G09G 3/3233
See application file for complete search history.

(56) References Cited

U.S. PATENT DOCUMENTS

| | | | |
|---|---|---|---|
| 8,284,136 B2 * | 10/2012 | Kang et al. ....................... | 345/82 |
| 8,314,707 B2 * | 11/2012 | Kobetski et al. .............. | 340/575 |
| 8,368,618 B2 * | 2/2013 | Choi ................................ | 345/76 |
| 2005/0017934 A1 | 1/2005 | Chung et al. | |
| 2012/0113077 A1 | 5/2012 | Kang | |
| 2012/0162052 A1 * | 6/2012 | Kim et al. ........................ | 345/77 |
| 2012/0327142 A1 * | 12/2012 | Kimura ......................... | 345/690 |
| 2014/0354711 A1 * | 12/2014 | In et al. ......................... | 345/691 |

FOREIGN PATENT DOCUMENTS

| | | |
|---|---|---|
| KR | 1020050005646 | 1/2005 |
| KR | 1020100054895 | 5/2010 |
| KR | 1020120048294 | 5/2012 |

* cited by examiner

*Primary Examiner* — Andrew Sasinowski
(74) *Attorney, Agent, or Firm* — Robert E. Bushnell, Esq.

(57) ABSTRACT

An organic light emitting display capable of improving display quality. The organic light emitting display includes a data driver for supplying bias power supply to data lines in a first period of one frame, for supplying reference power supply in a second period, and for supplying data signals in a fourth period, a scan driver for sequentially supplying scan signals to scan lines in the fourth period, pixels positioned at intersections of the scan lines and the data lines, and a first control line, a second control line, a third control line, and a fourth control line commonly coupled to the pixels. Each of the pixels includes a first capacitor for previously charging voltages corresponding to the data signals and a second capacitor charged by a voltage of the first capacitor in a third period between the second period and the fourth period.

17 Claims, 4 Drawing Sheets

PIXEL AND ORGANIC LIGHT EMITTING DISPLAY USING THE SAME

CLAIM OF PRIORITY

This application makes reference to, incorporates the same herein, and claims all benefits accruing under 35 U.S.C. §119 from an application for PIXEL AND ORGANIC LIGHT EMITTING DISPLAY USING THE SAME earlier filed in the Korean Intellectual Property Office on 13 Dec. 2012 and there duly assigned Serial No. 10-2012-145455.

BACKGROUND OF THE INVENTION

1. Field of the Invention

The present invention relates to a pixel and an organic light emitting display using the same, and more particularly, to a pixel capable of improving display quality and an organic light emitting display using the same.

2. Description of the Related Art

Recently, various flat panel displays (FPD) capable of reducing weight and volume that are disadvantages of cathode ray tubes (CRT) have been developed. The FPDs include liquid crystal displays (LCD), field emission displays (FED), plasma display panels (PDP), and organic light emitting displays.

Among the flat panel displays, the organic light emitting displays display images using organic light emitting diodes (OLED) that generate light by re-combination of electrons and holes. The organic light emitting display has high response speed and is driven with low power consumption.

The organic light emitting display includes a plurality of pixels arranged at intersections of a plurality of data lines, scan lines, and power supply lines in a matrix. Each of the pixels commonly includes an organic light emitting diode (OLED), at least two transistors including a driving transistor, and at least one capacitor.

The organic light emitting display has advantage in that an amount of used power is small, however, has disadvantage in that an amount of current that flows to the OLEDs changes in accordance with deviation in the threshold voltages of the driving transistors included in the pixels so that non-uniformity in display is caused. That is, the characteristics of the driving transistors change in accordance with the manufacturing process variables of the driving transistors included in the pixels. Actually, it is not possible to manufacture the organic light emitting display so that all of the transistors of the organic light emitting display have the same characteristic in current processes so that the deviation in the threshold voltages of the driving transistors is generated.

In order to solve the problem, a method of adding compensating circuits each formed of a plurality of transistors and a capacitor to the pixels, respectively, is suggested. The compensating circuits included in each of the pixels charge voltages corresponding to the threshold voltages of the driving transistors in one horizontal period so that the deviation in the driving transistors is compensated for.

On the other hand, recently, in order to realize a three-dimensional image, a method of driving the organic light emitting display with a driving frequency of no less than 120 Hz is required. However, when the organic light emitting display is driven at high speed of no less than 120 Hz, a period of charging the threshold voltages of the driving transistors is reduced so that it is not possible to compensate for the threshold voltages of the driving transistors.

In addition, in a conventional art, a structure in which the voltages of driving power supplies (a first power supply ELVDD and a second power supply ELVSS) are controlled in order to drive the organic light emitting display at the speed of 120 Hz is suggested. However, when the driving power supplies are controlled, there are problems such as high power consumption, an increase in the probability of an erroneous operation due to a parasitic capacitor, and generation of large electromagnetic interference (EMI).

SUMMARY OF THE INVENTION

Accordingly, the present invention has been made to provide a pixel capable of improving display quality and an organic light emitting display using the same.

In order to achieve the foregoing and/or other aspects of the present invention, there is provided an organic light emitting display, including a data driver for supplying bias power supply to data lines in a first period of one frame, for supplying reference power supply in a second period, and for supplying data signals in a fourth period, a scan driver for sequentially supplying scan signals to scan lines in the fourth period, pixels positioned at intersections of the scan lines and the data lines, and a first control line, a second control line, a third control line, and a fourth control line commonly coupled to the pixels. Each of the pixels includes a first capacitor for previously charging voltages corresponding to the data signals and a second capacitor charged by a voltage of the first capacitor in a third period between the second period and the fourth period.

Each of the pixels consists of NMOS transistors. The control driver supplies a first control signal to the first control line in the first period, supplies a second control signal to the second control line in the first period and a second period, supplies a third control signal to the third control line in the second period and a fourth period, and supplies a fourth control signal to the fourth control line in the third period. Each of the pixels includes an organic light emitting diode (OLED), a first transistor for controlling an amount of current supplied from a first power supply to the OLED to correspond to a voltage applied to a second node, a second transistor coupled between a third node that is a common node of the OLED and the first transistor and an initializing power supply and turned on when the firsts control signal is supplied, a third transistor coupled between the second node and the data line and turned on when the second control signal is supplied, a fourth transistor coupled between the second node and a first node and turned on when the fourth control signal is supplied, the first capacitor coupled between the first node and a fixed voltage source, and the second capacitor coupled between the second node and the third node.

The fixed voltage source is set as the initializing power supply. The bias power supply is set to have a voltage value supplied to a gate electrode of the first transistor to apply an on bias voltage or an off bias voltage to the first transistor. The reference power supply is set to have a voltage at which the first transistor may be turned on. The reference power supply is set to have a higher voltage than that of the initializing power supply. Each of the pixels includes a fifth transistor coupled between the data line and the first node and turned on when a scan signal is supplied and a sixth transistor coupled between the first power supply and the first transistor and turned on when the third control signal is supplied. Each of the pixels includes a fifth transistor coupled between the data line and the first node and turned on when a scan signal is supplied and a sixth transistor coupled between the third node and the OLED and turned on when the third control signal is supplied.

There is provided a pixel, including an OLED, a first transistor for controlling an amount of current supplied from a first power supply to the OLED to correspond to a voltage applied to a second node, a third transistor coupled between the second node and a data line, a second transistor coupled between a third node that is a common terminal of the OLED and the first transistor and an initializing power supply and turned on in a partial period of a period in which the third transistor is turned on, a fourth transistor that is coupled between a first node and the second node and whose turn-on period does not overlap those of the second transistor and the third transistor, a first capacitor coupled between the first node and a fixed voltage source, and a second capacitor coupled between the second node and the third node.

The pixel further includes a fifth transistor coupled between the data line and the first node and turned on when a scan signal is supplied to a scan line. The pixel further includes a sixth transistor coupled between the first power supply and the first transistor, turned on in a remaining period excluding the partial period of a period in which the third transistor is turned on, and turned on in a period where the scan signal is supplied to the scan line. The pixel further includes a sixth transistor coupled between the third node and the OLED, turned on in a remaining period excluding the partial period of a period in which the third transistor is turned on, and turned on in a period where the scan signal is supplied to the scan line. The fixed voltage source is set as the initializing power supply. The first capacitor is set to have higher capacity than that of the second capacitor. The first to fourth transistors are NMOS transistors.

In the pixel according to the present invention and the organic light emitting display using the same, the threshold voltages of the pixels are simultaneously compensated for so that a threshold voltage compensating period may be sufficiently secured even at a driving frequency of no less than 120 Hz. In addition, according to the present invention, driving power supplies maintain constant voltages so that it is possible to minimize power consumption and to secure reliability of driving. Additionally, the pixel according to the present invention consists of the NMOS transistors so that manufacturing cost may be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
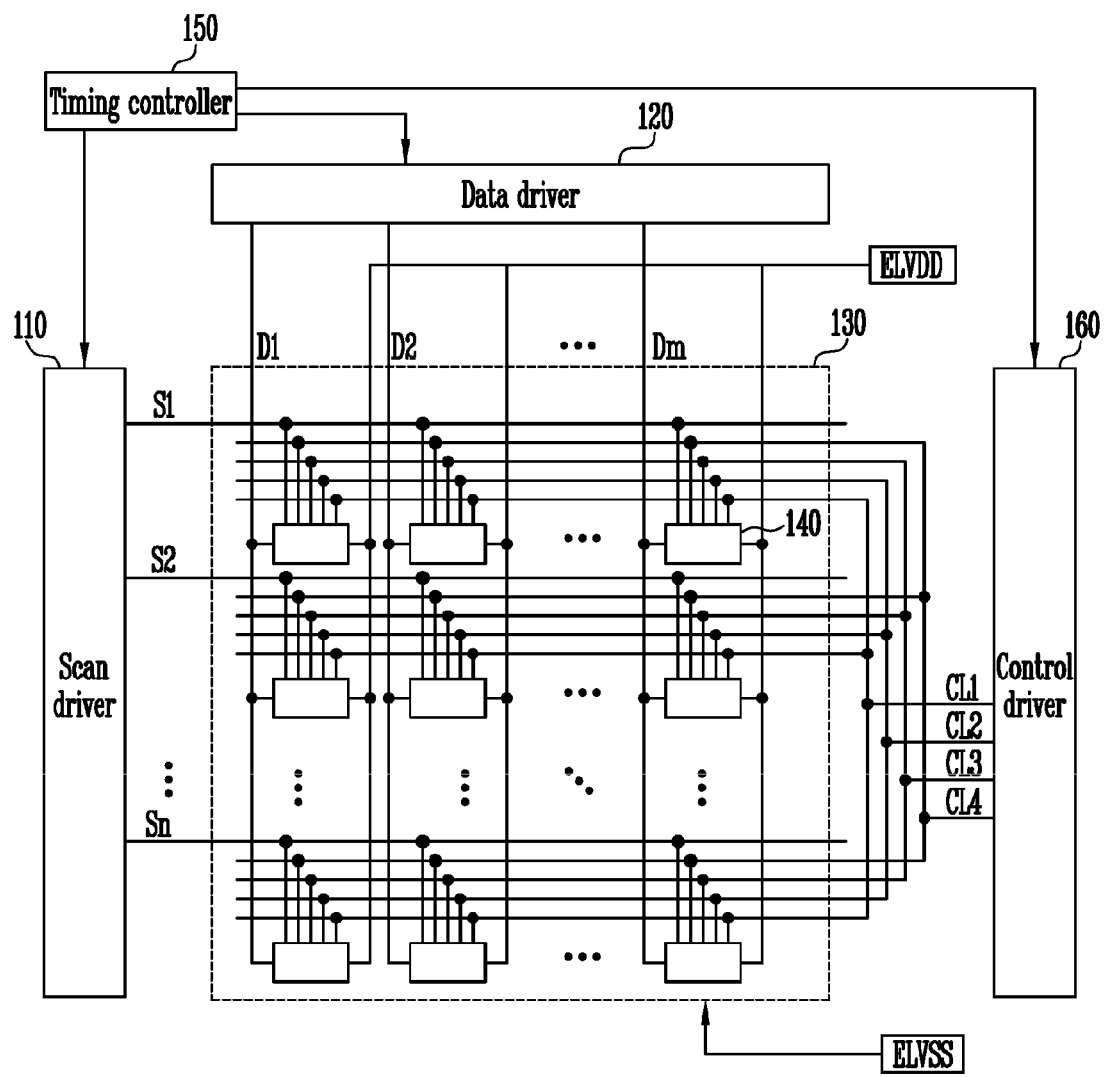
FIG. 1 is a view illustrating an organic light emitting display according to an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, a pixel and an organic light emitting display using the same will be described in detail as follows with reference to FIGS. 1 to 7 in which preferred embodiments by which those who skilled in the art may easily perform the present invention are included.

FIG. 1 is a view illustrating an organic light emitting display according to an embodiment of the present invention.

Referring to FIG. 1, the organic light emitting display according to the embodiment of the present invention includes pixels 140 positioned at the intersections of scan lines S1 to Sn and data lines D1 to Dm, a pixel unit 130 including the pixels 140 arranged in a matrix, a scan driver 110 for driving the scan lines S1 to Sn, a data driver 120 for driving the data lines D1 to Dm, a control driver 160 for driving a first control line CL1, a second control line CL2, a third control line CL3, and a fourth control line CL4 commonly coupled to the pixels 140, and a timing controller 150 for controlling the scan driver 110, the data driver 120, and the control driver 160.

The scan driver 110 sequentially supplies scan signals to the scan lines S1 to Sn. For example, the scan driver 110 may sequentially supply the scan signals to the scan lines S1 to Sn in a fourth period T4 of one frame as illustrated in FIG. 3.

Figure 3:
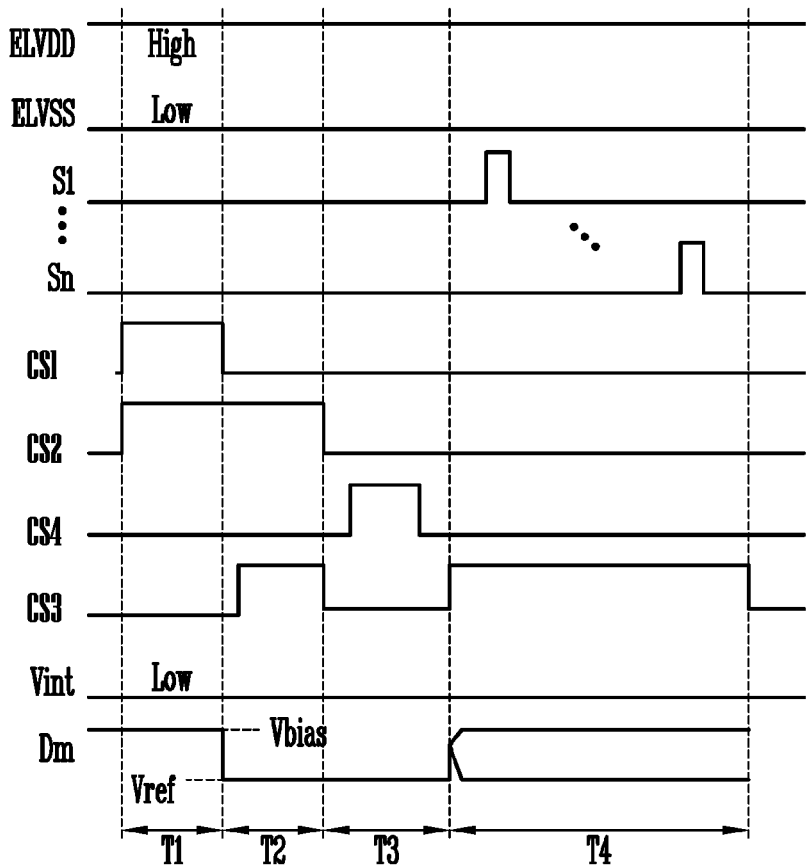
FIG. 3 is a waveform diagram illustrating an embodiment of a method of driving the pixel illustrated in FIG. 2.

Referring to FIGS. 1 and 3, the control driver 160 supplies a first control signal CS1 to the first control line CL1 in a first period T1; supplies a second control signal CS2 to the second control line CL2 in the first period T1 and the second period T2; supplies a third control signal CS3 to the third control line CL3 in a second period T2 and the fourth period T4; and supplies a fourth control signal CS4 to the fourth control line CL4 in a third period T3.

Here, in the first period T1, the voltage of a bias power supply is applied to the driving transistors included in the pixels 140. In the second period T2, the threshold voltages of the driving transistors are compensated for. In the third period T3, the voltages of data signals are supplied to the gate electrodes of the driving transistors. In the fourth period T4, the data signals from the data driver 120 are supplied to the pixels 140. Here, the threshold voltages of the driving transistors included in the pixels 140 are simultaneously compensated for in the second period T2. Therefore, according to the present invention, the width of the second period T2 may be controlled to stably compensate for the threshold voltages of the driving transistors.

The data driver 120 supplies the bias power supply Vbias to the data lines D1 to Dm in the first period T1 and supplies a reference power supply Vref in the second period T2. The data driver 120 supplies the data signals to the data lines D1 to Dm in synchronization with the scan signals in the fourth period T4. Here, the bias power supply Vbias is set to have a voltage value for applying on bias or off bias to the driving transistors. The reference power supply Vref is set to have a voltage at which the driving transistors may be turned on.

On the other hand, according to the present invention, the first to fourth control signals and the scan signals are set to have voltages at which the transistors included in the pixels 140 may be turned on. For example, the first to fourth control signals and the scan signals may be set to have high voltages. In FIG. 1, the control driver 160 is provided in order to drive the first to fourth control lines CL1 to CL4. However, the present invention is not limited to the above. For example, the first to fourth control lines CL1 to CL4 may be coupled to the scan driver 110 to be driven.

Figure 2:
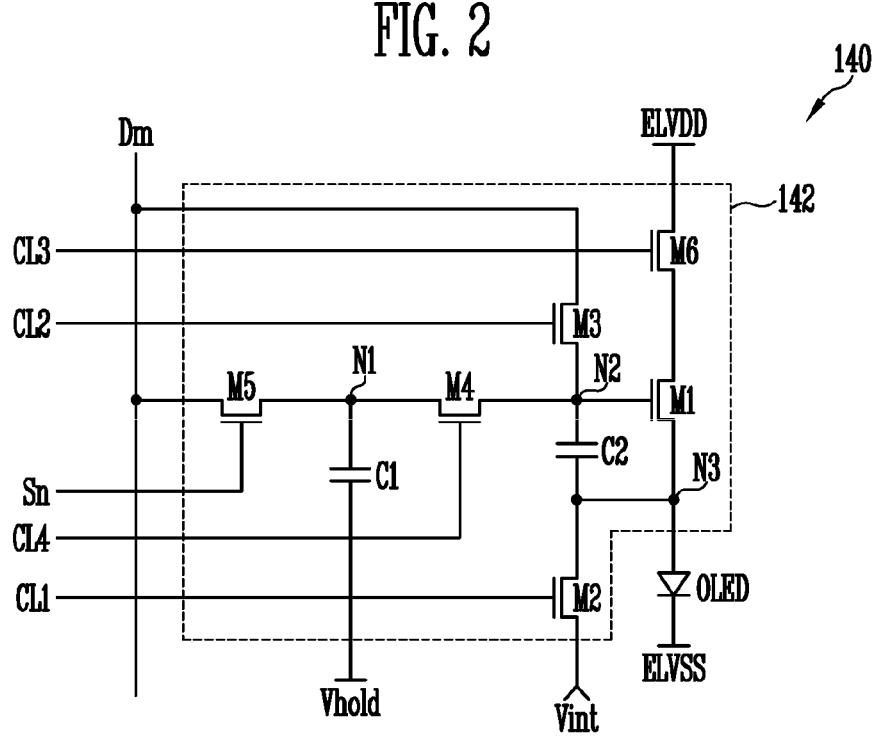
FIG. 2 is a view illustrating a first embodiment of the pixel illustrated in FIG. 1.

FIG. 2 is a view illustrating a first embodiment of the pixel illustrated in FIG. 1. In FIG. 2, for convenience sake, the pixel coupled to the mth data line Dm and the nth scan line Sn will be illustrated.

Referring to FIG. 2, a pixel 140 according to the first embodiment of the present invention includes an organic light emitting diode (OLED) and a pixel circuit 142 for controlling the amount of current supplied to the OLED.

The anode electrode of the OLED is coupled to the third node N3 of the pixel circuit 142 and the cathode electrode of the OLED is coupled to a second power supply ELVSS. Here, the second power supply ELVSS is set to have a lower voltage than that of a first power supply ELVDD. The OLED generates light with predetermined brightness to correspond to the amount of current supplied from the pixel circuit 142.

The pixel circuit 142 controls the amount of current supplied to the OLED to correspond to a data signal. For this purpose, the pixel circuit 142 includes first to sixth transistors M1 to M6, a first capacitor C1, and a second capacitor C2.

The first electrode of the first transistor M1 (the driving transistor) is coupled to the second electrode of the sixth transistor M6 and the second electrode of the first transistor M1 is coupled to the third node N3. The gate electrode of the first transistor M1 is coupled to a second node N2. The first transistor M1 controls the amount of current supplied to the OLED to correspond to the voltage applied to the second node N2. On the other hand, according to the present invention, the first electrode is set as a drain electrode or a source electrode and the second electrode is set as a different electrode from the first electrode. For example, when the first electrode is set as the drain electrode, the second electrode is set as the source electrode.

The first electrode of the second transistor M2 is coupled to the third node N3 and the second electrode of the second transistor M2 is coupled to an initializing power supply Vint. The gate electrode of the second transistor M2 is coupled to the first control line CL1. The second transistor M2 is turned on when the first control signal CS1 is supplied to the first control line CL1 to supply the voltage of the initializing power supply Vint to the third node N3. Here, the initializing power supply Vint is set to have a lower voltage than the reference power supply Vref.

The first electrode of the third transistor M3 is coupled to the data line Dm and the second electrode of the third transistor M3 is coupled to the second node N2. The gate electrode of the third transistor M3 is coupled to the second control line CL2. The third transistor M3 is turned on when the second control signal CS2 is supplied to the second control line CL2 to electrically couple the data line Dm and the second node N2 to each other.

The fourth transistor M4 is coupled between the first node N1 and the second node N2. The gate electrode of the fourth transistor M4 is coupled to the fourth control line CL4. The fourth transistor M4 is turned on when the fourth control signal CS4 is supplied to the fourth control line CL4 to electrically couple the first node N1 and the second node N2 to each other.

The first electrode of the fifth transistor M5 is coupled to the data line Dm and the second electrode of the fifth transistor M5 is coupled to the first node N1. The gate electrode of the fifth transistor M5 is coupled to the scan line Sn. The fifth transistor M5 is turned on when a scan signal is supplied to the scan line Sn to electrically couple the data line Dm and the first node N1 to each other.

The first electrode of the sixth transistor M6 is coupled to the first power supply ELVDD and the second electrode of the sixth transistor M6 is coupled to the first electrode of the first transistor M1. The gate electrode of the sixth transistor M6 is coupled to the third control line CL3. The sixth transistor M6 is turned on when the third control signal CS3 is supplied to the third control line CL3 to supply the voltage of the first power supply ELVDD to the first electrode of the first transistor M1.

The first capacitor C1 is coupled between the first node N1 and a fixed voltage source Vhold. The first capacitor C1 stores the voltage of the data signal in the fourth period T4. Here, the fixed voltage source Vhold may be set as one of various power supplies used by the organic light emitting display.

The second capacitor C2 is coupled between the second node N2 and the third node N3. The second capacitor C2 is charged by the voltage charged in the first capacitor C1, that is, the voltage corresponding to the data signal in the third period T3. For this purpose, the first capacitor C1 is formed to have higher capacity than the second capacitor C2.

FIG. 3 is a waveform diagram illustrating an embodiment of a method of driving the pixel illustrated in FIG. 2. In FIG. 3, for convenience sake, the voltage corresponding to the on bias is supplied to the data line Dm in the first period T1. However, the present invention is not limited to the above. For example, the voltage corresponding to the off bias may be supplied to the data line Dm in the first period T1.

Referring to FIGS. 2 and 3, according to the present invention, the first power supply ELVDD and the second power supply ELVSS maintain uniform voltages without a change. The initializing power supply Vint maintains a uniform voltage without a change.

First, the first control signal CS1 is supplied to the first control line CL1 and the second control signal CS2 is supplied to the second control line CL2 in the first period T1. When the first control signal CS1 is supplied to the first control line CL1, the second transistor M2 is turned on. When the second transistor M2 is turned on, the voltage of the initializing power supply Vint is supplied to the third node N3.

When the second control signal CS2 is supplied to the second control line CL2, the third transistor M3 is turned on. When the third transistor M3 is turned on, the bias power supply Vbias from the data line Dm is supplied to the second node N2. At this time, the voltage of the on bias power supply is applied to the first transistor M1 and the threshold voltage characteristic of the first transistor M1 is initialized to a predetermined state to correspond to the voltage of the on bias power supply. When the characteristic of the first transistor M1 is initialized before the data signal is supplied, an image with desired brightness may be displayed regardless of the data signal supplied to a previous frame.

In the second period T2, the third control signal CS3 is supplied to the third control line CL3 and supply of the second control signal CS2 to the second control line CL2 is maintained. When the third control signal CS3 is supplied to the third control line CL3, the sixth transistor M6 is turned on. When the sixth transistor M6 is turned on, the voltage of the first power supply ELVDD is supplied to the first electrode of the first transistor M1.

On the other hand, the third transistor M3 maintains a turn-on state in the second period T2 to correspond to the second control signal CS2. When the third transistor M3 is turned on, the voltage of the reference power supply Vref from the data line Dm is supplied to the second node N2. Here, the reference power supply Vref is set to have a higher voltage than that of the initializing power supply Vint. Therefore, in the second period T2, the voltage of the third node N3 is increased from the voltage of the initializing power supply Vint to the voltage obtained by subtracting the threshold voltage of the first transistor M1 from the voltage of the reference power supply Vref.

That is, in the second period T2, the voltage of the second node N2 is set as the voltage of the reference power supply Vref and the voltage of the third node N3 is set as the voltage obtained by subtracting the threshold voltage of the first transistor M1 from the reference power supply Vref. In this case, the voltage corresponding to the threshold voltage of the first transistor M1 is charged in the second capacitor C2.

In the third period T3, the fourth control signal CS4 is supplied to the fourth control line CL4. When the fourth control signal CS4 is supplied to the fourth control line CL4, the fourth transistor M4 is turned on. When the fourth transistor M4 is turned on, the first node N1 and the second node N2 are electrically coupled to each other. Then, the voltage charged in the first capacitor C1, that is, the voltage corresponding to the data signal of a previous frame is supplied to the second node N2. At this time, the second capacitor C2 charges to a voltage to correspond to the voltage applied to the second node N2.

On the other hand, in the third period T3, the voltage of the third node N3 changes to correspond to the amount of change in the voltage of the second node N2. Therefore, the voltages corresponding to the threshold voltage of the first transistor M1 and the data signal are stored in the second capacitor C2.

In the fourth period T4, the third control signal CS3 is supplied to the third control line CL3. When the third control signal CS3 is supplied to the third control line CL3, the sixth transistor M6 is turned on. Then, the first transistor M1 controls the amount of current that flows from the first power supply ELVDD to the second power supply ELVSS via the OLED to correspond to the voltage applied to the second node N2. In this case, the OLED generates light with a brightness corresponding to the amount of current.

In addition, in the fourth period t4, the scan signals are sequentially supplied to the scan lines S1 to Sn. When the scan signals are sequentially supplied to the scan lines S1 to Sn, the fifth transistor M5 included in each of the pixels 140 is turned on in units of horizontal lines. At this time, when the fifth transistor M5 is turned on, the data signal from the data line Dm is supplied to the first node N1. In this case, the first capacitor C1 charges the voltage corresponding to the data signal.

According to the present invention, the above-described processes are repeated to realize a predetermined image. On the other hand, according to the present invention, the width of the second period T2 may be controlled so that the threshold voltage of the driving transistor M1 may be stably compensated for. That is, the present invention may be applied to a panel driven at high speed of no less than 120 Hz.

In addition, according to the present invention, the driving power supplies (the first power supply ELVDD and the second power supply ELVSS) maintain uniform constant voltages. In this case, it is possible to reduce power consumption and to secure reliability of driving. Furthermore, the pixel according to the present invention consists of NMOS transistors having simple manufacturing processes so that manufacturing cost may be reduced.

Figure 4:
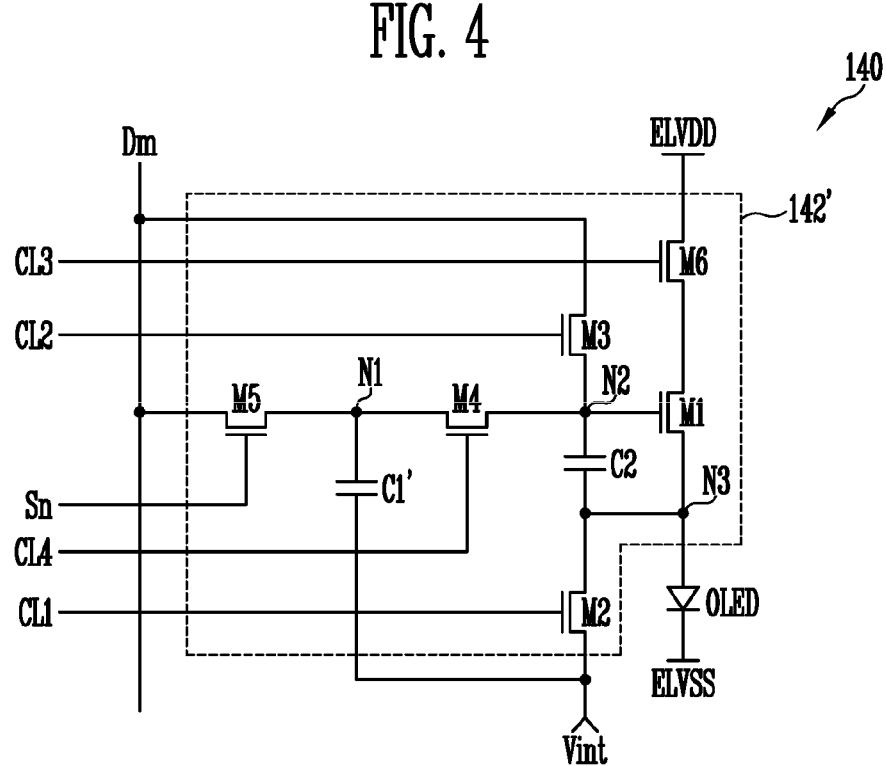
FIG. 4 is a view illustrating a second embodiment of the pixel illustrated in FIG. 1.

FIG. 4 is a view illustrating a second embodiment of the pixel illustrated in FIG. 1. In describing FIG. 4, like reference numerals refer to like elements and detailed description of the elements will be omitted.

Referring to FIG. 4, a pixel 140 according to the second embodiment of the present invention includes an OLED and a pixel circuit 142' for controlling the amount of current supplied to the OLED.

In the pixel circuit 142', the first capacitor C1' is coupled between the first node N1 and the initializing power supply Vint. That is, in the second embodiment of the present invention, the fixed voltage source Vhold is selected as the initializing power supply Vint. Since the other operation processes are the same as those of FIG. 2, detailed description thereof will be omitted.

Figure 5:
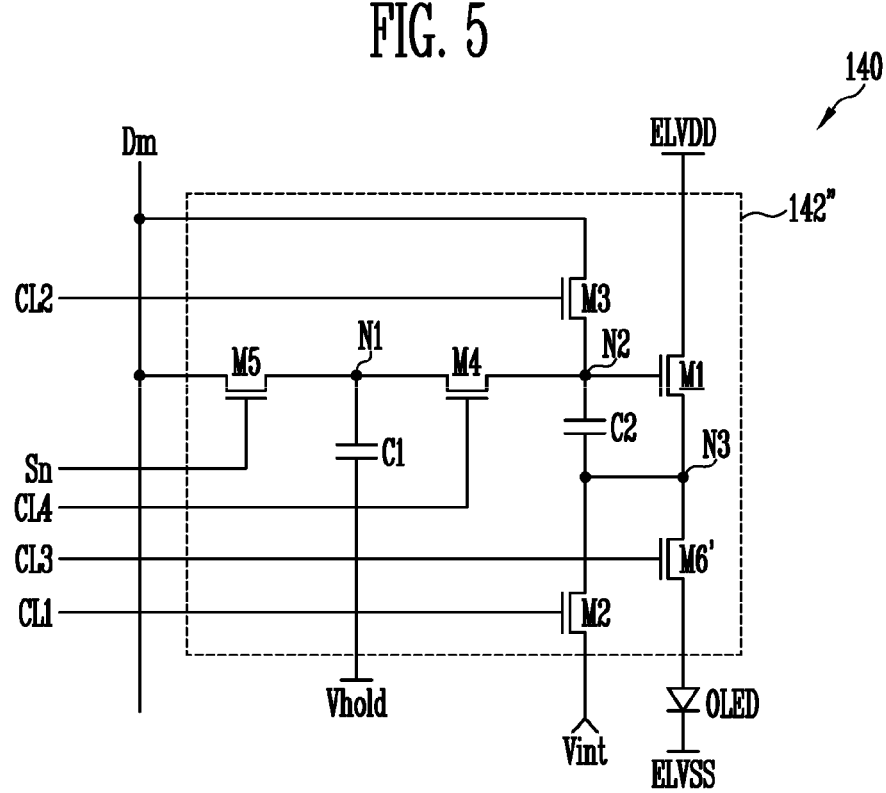
FIG. 5 is a view illustrating a third embodiment of the pixel illustrated in FIG. 1.

FIG. 5 is a view illustrating a third embodiment of the pixel illustrated in FIG. 1. In describing FIG. 5, like reference numerals refer to like elements and detailed description of the elements will be omitted.

Referring to FIG. 5, a pixel 140 according to the third embodiment of the present invention includes an OLED and a pixel circuit 142" for controlling the amount of current supplied to the OLED.

In the pixel circuit 142", the sixth transistor M6' is coupled between the third node N3 and the anode electrode of the OLED. Since the other operation processes are the same as those of FIG. 2, detailed description thereof will be omitted.

Figure 6:
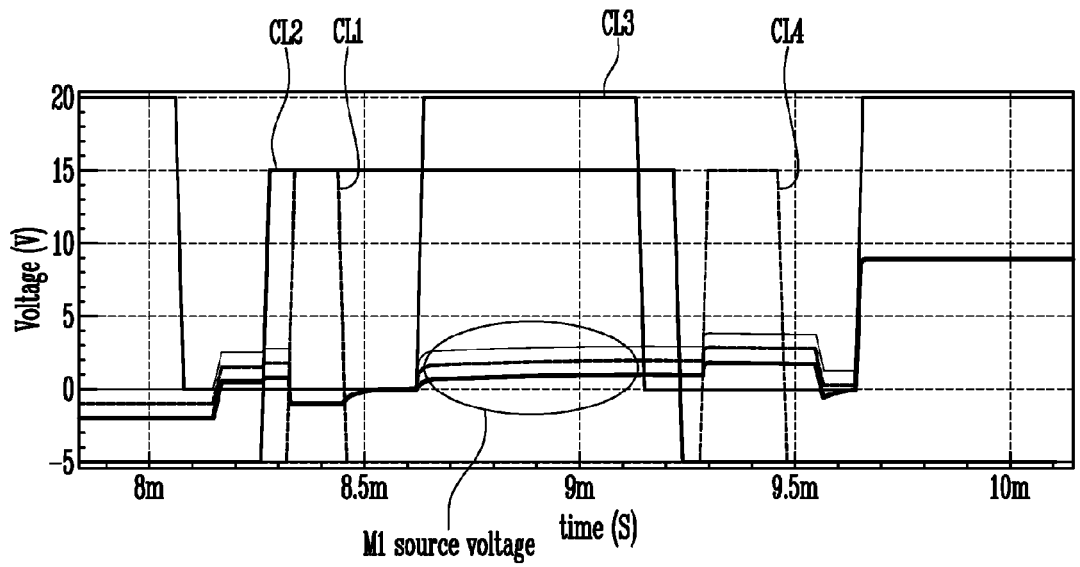
FIG. 6 is a simulation result illustrating the operation processes of the pixels according to the embodiments of the present invention.

FIG. 6 is a simulation result illustrating the operation processes of the pixels according to the embodiments of the present invention. FIG. 6 is a view illustrating the range of fluctuation of the voltages of the third node N3 with respect to three driving transistors having deviation in threshold voltages of 1V.

Referring to FIG. 6, the voltages of the third nodes (N3) included in the pixels 140 are different from each other due to the deviation in the threshold voltages of the corresponding driving transistors. That is, the voltages of the third nodes change to correspond to the threshold voltages of the driving transistors so that the threshold voltages of the driving transistors may be stably compensated for.

Figure 7:
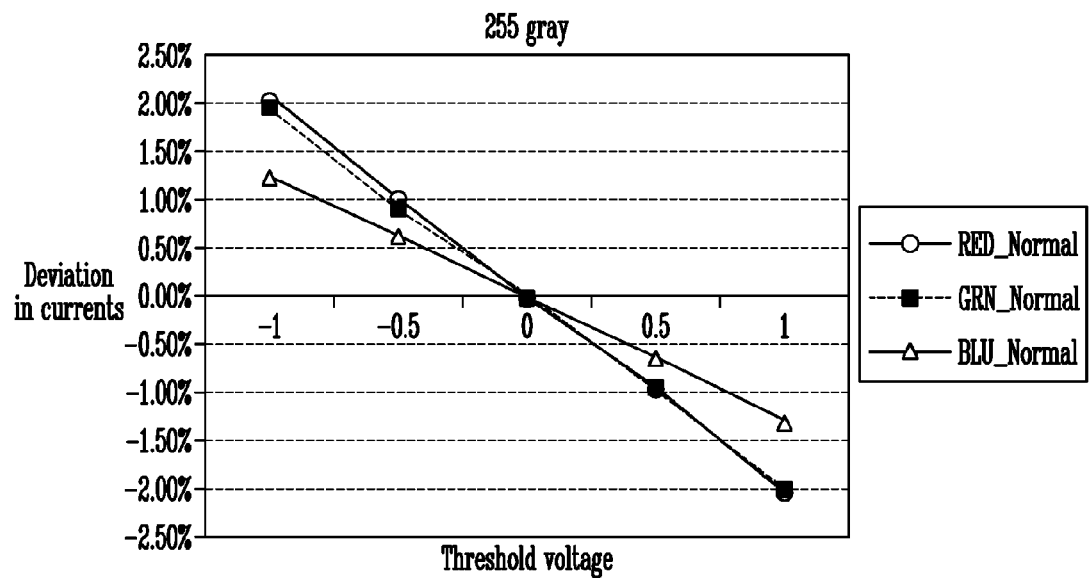
FIG. 7 is a view illustrating deviation in currents corresponding to the threshold voltages of the pixels according to the embodiments of the present invention.

FIG. 7 is a view illustrating deviation in currents corresponding to the threshold voltages of the pixels according to the embodiments of the present invention. FIG. 7 illustrates that the first capacitor C1 is set to have capacity four times larger than that of a second capacitor C4.

Referring to FIG. 7, when full white is realized, when the threshold voltages of the driving transistors are changed by ±0.5V, currents are set to have errors of ±1%. That is, according to the present invention, changes in the amounts of currents that flow from the driving transistors are set to be low to correspond to changes in the threshold voltages of the driving transistors so that it is possible to stably realize an image with desired brightness.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. An organic light emitting display, comprising:
a data driver for supplying bias power supply to data lines in a first period of one frame, for supplying reference power supply in a second period, and for supplying data signals in a fourth period;

a scan driver for sequentially supplying scan signals to scan lines in the fourth period;

pixels positioned at intersections of the scan lines and the data lines; and a first control line, a second control line, a third control line, and a fourth control line coupled to the pixels from a control driver, each of the pixels comprising:

a first capacitor for previously charging voltages corresponding to the data signals; and a second capacitor charged by a voltage of the first capacitor in a third period between the second period and the fourth period.

2. The organic light emitting display as claimed in claim 1, wherein each of the pixels consists of NMOS transistors.

3. The organic light emitting display as claimed in claim 1, wherein the control driver supplies a first control signal to the first control line in the first period, supplies a second control signal to the second control line in the first period and a second period, supplies a third control signal to the third control line in the second period and a fourth period, and supplies a fourth control signal to the fourth control line in the third period.

4. The organic light emitting display as claimed in claim 3, wherein each of the pixels comprises:

an organic light emitting diode;

a first transistor for controlling an amount of current supplied from a first power supply to the organic light emitting diode to correspond to a voltage applied to a second node;

a second transistor coupled between a third node that is a common node of the organic light emitting diode and the first transistor and an initializing power supply and turned on when the firsts control signal is supplied;

a third transistor coupled between the second node and the data line and turned on when the second control signal is supplied;

a fourth transistor coupled between the second node and a first node and turned on when the fourth control signal is supplied;

the first capacitor coupled between the first node and a fixed voltage source; and the second capacitor coupled between the second node and the third node.

5. The organic light emitting display as claimed in claim 4, wherein the fixed voltage source is set as the initializing power supply.

6. The organic light emitting display as claimed in claim 4, wherein the bias power supply is set to have a voltage value supplied to a gate electrode of the first transistor to apply an on bias voltage or an off bias voltage to the first transistor.

7. The organic light emitting display as claimed in claim 4, wherein the reference power supply is set to have a voltage at which the first transistor may be turned on.

8. The organic light emitting display as claimed in claim 4, wherein the reference power supply is set to have a higher voltage than that of the initializing power supply.

9. The organic light emitting display as claimed in claim 4, wherein each of the pixels comprises:

a fifth transistor coupled between the data line and the first node and turned on when a scan signal is supplied; and a sixth transistor coupled between the first power supply and the first transistor and turned on when the third control signal is supplied.

10. The organic light emitting display as claimed in claim 4, wherein each of the pixels comprises:

a fifth transistor coupled between the data line and the first node and turned on when a scan signal is supplied; and a sixth transistor coupled between the third node and the OLED and turned on when the third control signal is supplied.

11. A pixel, comprising:

an organic light emitting diode;

a first transistor for controlling an amount of current supplied from a first power supply to the organic light emitting diode to correspond to a voltage applied to a second node;

a third transistor coupled between the second node and a data line;

a second transistor coupled between a third node that is a common terminal of the organic light emitting diode and the first transistor and an initializing power supply and turned on in a partial period of a period in which the third transistor is turned on;

a fourth transistor that is coupled between a first node and the second node and whose turn-on period does not overlap those of the second transistor and the third transistor;

a first capacitor coupled between the first node and a fixed voltage source; and a second capacitor coupled between the second node and the third node.

12. The pixel as claimed in claim 11, further comprising a fifth transistor coupled between the data line and the first node and turned on when a scan signal is supplied to a scan line.

13. The pixel as claimed in claim 12, further comprising a sixth transistor coupled between the first power supply and the first transistor, turned on in a remaining period excluding the partial period of a period in which the third transistor is turned on, and turned on in a period where the scan signal is supplied to the scan line.

14. The pixel as claimed in claim 12, further comprising a sixth transistor coupled between the third node and the organic light emitting diode, turned on in a remaining period excluding the partial period of a period in which the third transistor is turned on, and turned on in a period where the scan signal is supplied to the scan line.

15. The pixel as claimed in claim 11, wherein the fixed voltage source is set as the initializing power supply.

16. The pixel as claimed in claim 11, wherein the first capacitor is set to have higher capacity than that of the second capacitor.

17. The pixel as claimed in claim 11, wherein the first to fourth transistors are NMOS transistors.

* * * * *